(12) United States Patent
Zaitsu

(10) Patent No.: US 7,986,522 B2
(45) Date of Patent: Jul. 26, 2011

(54) PORTABLE TERMINAL DEVICE

(75) Inventor: Masayuki Zaitsu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 226 days.

(21) Appl. No.: 12/091,030

(22) PCT Filed: Oct. 17, 2006

(86) PCT No.: PCT/JP2006/320661
§ 371 (c)(1),
(2), (4) Date: Apr. 21, 2008

(87) PCT Pub. No.: WO2007/046380
PCT Pub. Date: Apr. 26, 2007

(65) Prior Publication Data
US 2009/0122477 A1    May 14, 2009

(30) Foreign Application Priority Data

Oct. 21, 2005  (JP) ................ 2005-307594

(51) Int. Cl.
*H05K 5/00*  (2006.01)
*G09G 5/00*  (2006.01)
*G06F 3/02*  (2006.01)
*H04M 1/00*  (2006.01)

(52) U.S. Cl. ............. 361/679.55; 361/679.56; 345/156; 345/168; 345/169; 345/170; 455/575.1; 455/575.3

(58) Field of Classification Search ............. 361/679.01, 361/679.02, 679.55–679.59, 679.08, 679.09, 361/679.3; 345/156, 157, 168, 169; 455/575.1; 248/917–924
See application file for complete search history.

(56) References Cited

U.S. PATENT DOCUMENTS

2003/0224739 A1*  12/2003  Ikuta ............... 455/90.3
(Continued)

FOREIGN PATENT DOCUMENTS

JP    2001189788 A    7/2001
(Continued)

OTHER PUBLICATIONS

Japanese language (with partial translation) for Non-Patent documents; Watch Show Case; Watch; k-tai@impress.co.jp; Copyright (c) 2004 Impress Corporation, an Impress Group company.
(Continued)

*Primary Examiner* — Zachary M Pape
*Assistant Examiner* — Jerry Wu
(74) *Attorney, Agent, or Firm* — DLA Piper LLP (US)

(57) ABSTRACT

A portable telephone 1 is a portable terminal device in which a telephone receiving housing 2 is coupled to a telephone transmitting housing 3 by a coupling portion 4 such that they can be opened and closed. In the telephone receiving housing 2, a projecting portion 21 is formed on an end portion of a first face S1, which faces the telephone transmitting housing 3 in the closed state. In the telephone transmitting housing 3, a notched portion 22 is formed in an end portion thereof, in which the projecting portion 21 is arranged such that the projecting portion is rotatably coupled to notched portion 22. A switch is provided inside the projecting portion 21 and a sub-key capable of depressing this switch is provided to the projecting portion 21. The sub-key is provided on a surface of the projecting portion 21 in such a manner that a depression direction of the sub-key coincides with a depression direction of the main key in the opened state.

8 Claims, 9 Drawing Sheets

U.S. PATENT DOCUMENTS

2004/0209645 A1 * 10/2004 Park et al. .................. 455/556.1

FOREIGN PATENT DOCUMENTS

| JP | 2002-016685 | | 1/2002 |
|---|---|---|---|
| JP | 2002-204298 | | 7/2002 |
| JP | 2003-037657 | | 2/2003 |
| JP | 2004-228299 | A | 8/2004 |
| JP | 2004-316684 | | 11/2004 |
| JP | 2005-044673 | | 2/2005 |
| JP | 2005-110114 | | 4/2005 |
| JP | 2005-124127 | A | 5/2005 |
| JP | 2005136722 | A | 5/2005 |
| JP | 2005-269167 | | 9/2005 |
| JP | 2005-286430 | | 10/2005 |
| WO | 2005-015885 | A2 | 2/2005 |

OTHER PUBLICATIONS

Japanese language office action and its English translation for corresponding Japanese application No. 2005-307594 lists the references above.

* cited by examiner

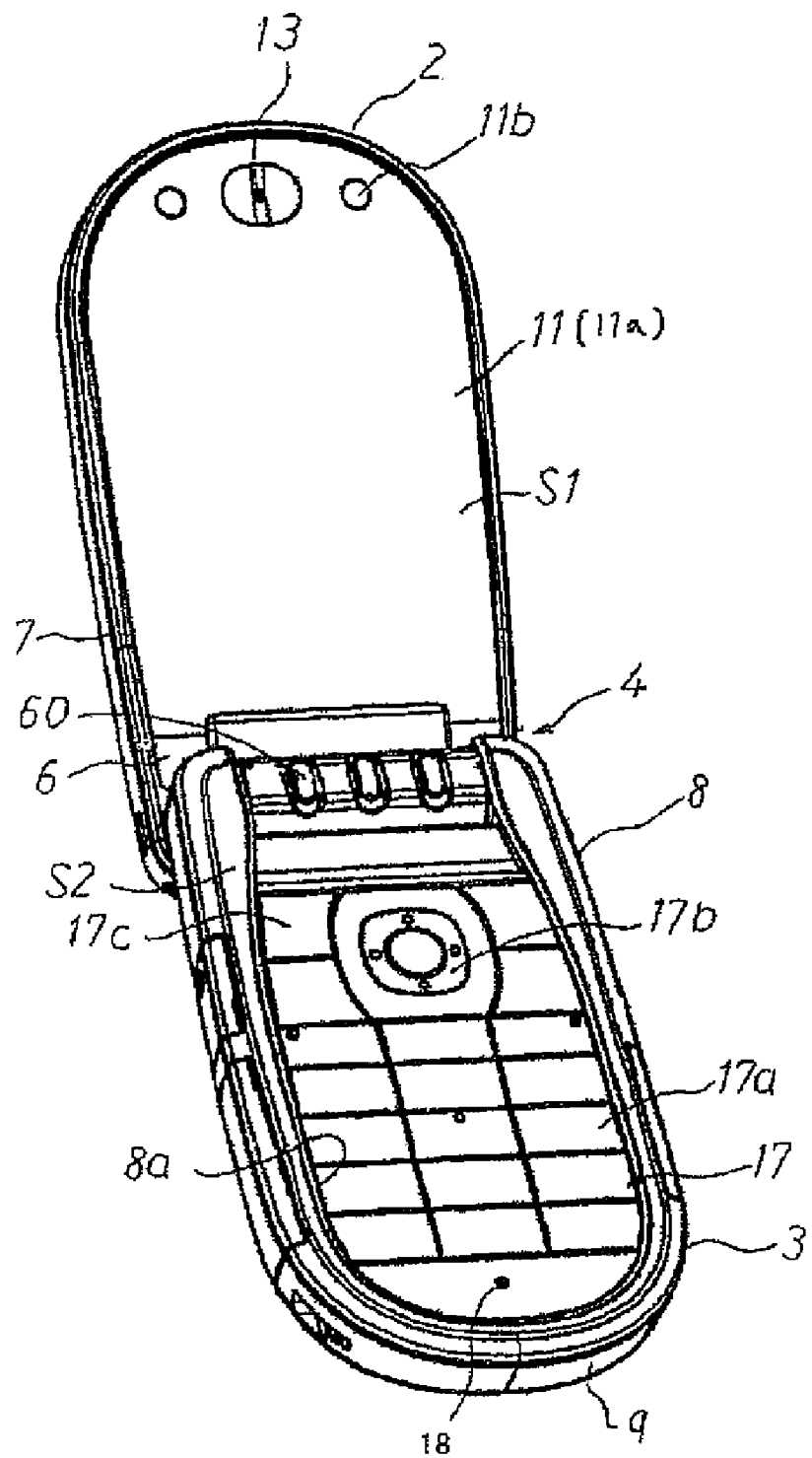

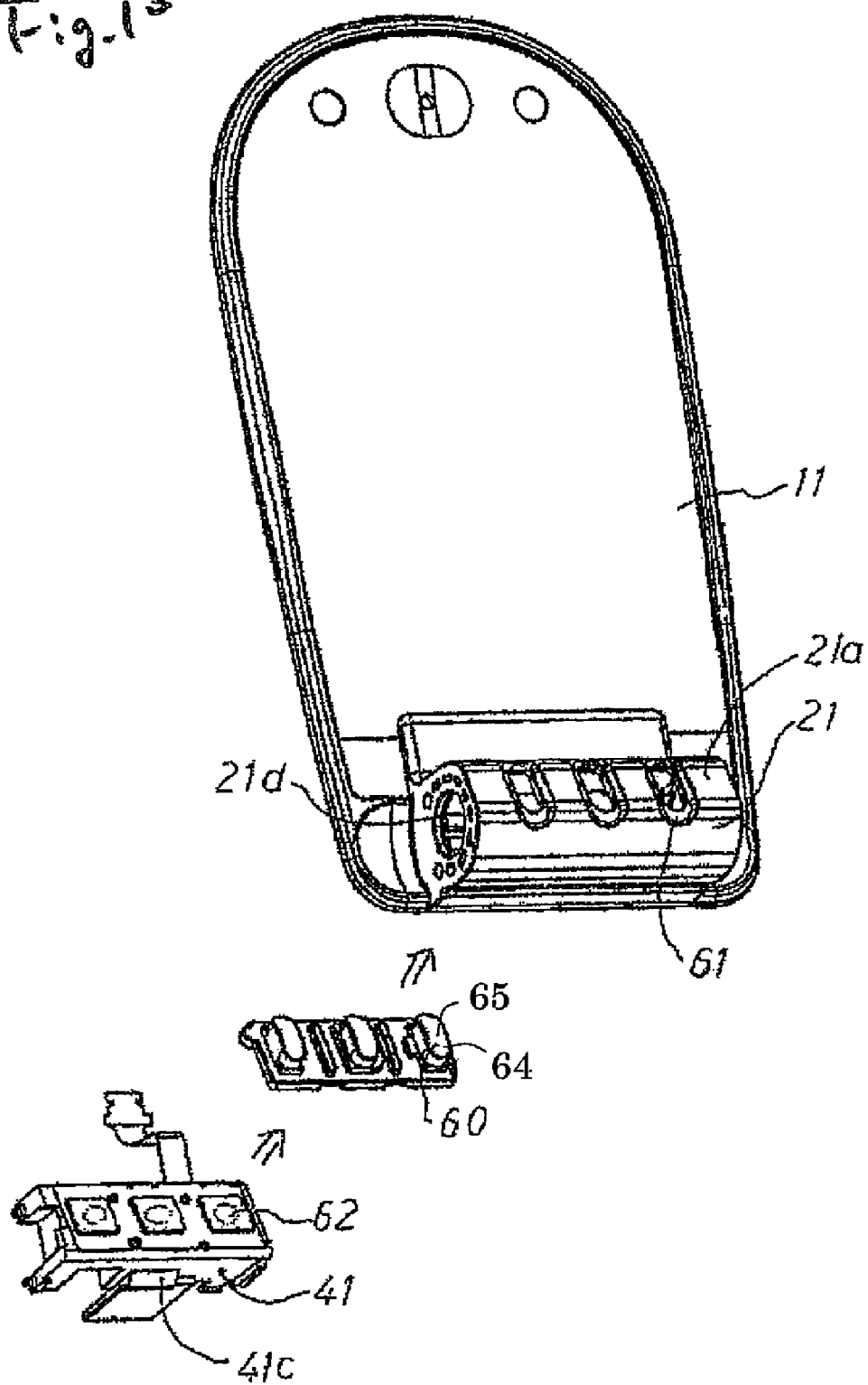

PORTABLE TERMINAL DEVICE

Cross-Reference to the Related Applications

This application is a national stage of international application No. PCT/JP2006/320661 filed on Oct. 17, 2006, which also claims benefit of priority under 35 U.S.C. §119 to Japanese Patent Application No. 2005-307594 filed on Oct. 21, 2005, the entire contents of which are incorporated herein by reference.

TECHNICAL FIELD

The present invention is related to a portable terminal device such as a portable telephone and a notebook computer.

BACKGROUND ART

Functions of portable telephones have been increased, for instance, camera modules are mounted on the portable telephones. In such portable telephones, the number of keys is increased. Originally, keys are only for such function of entering telephone numbers of communication opponent parties so as to establish telephone callings. However, nowadays, not only numeric keys and a telephone calling key, but also various sorts of keys have been additionally provided.

In a patent publication 1, as one example for responding to increase in a total number of keys, such a foldable portable telephone is disclosed. In the portable telephone, keys are provided on side faces thereof, which are exposed in a closed sate where a housing of the folding type portable telephone is closed.

Patent Publication 1: JP-A-2002-204298

DISCLOSURE OF THE INVENTION

Problems that the Invention is to Solve

However, although such a way that the keys are provided on the side faces of the housing may be one of the solving means, it is not sufficient to satisfy various needs from users with only this way, and also a degree of freedom of designs may be narrow. For instance, if the number of keys is required to be increased, there is no way other than the way in which sizes of numeric keys and direction keys are reduced so as to produce a space, and new keys are arranged in this space. Otherwise, a size of a housing has to be increased.

An object of the present invention is to provide a portable terminal device equipped with a novel operation portion having a superior operability in addition to widen a degree of freedom of designs.

Means for Solving the Problems

A portable terminal device according to a first aspect of the present invention, is a portable terminal device in which a first housing is coupled to a second housing such that the first housing and the second housing can be opened and closed to be an opened state and a closed state, wherein the first housing comprises: a display portion provided on a first face facing the second housing in the closed state; and a projecting portion at an end portion of the first face, wherein the second housing comprises: a main key provided on a second face facing the first housing in the closed state; and a notched portion which is provided on an end portion of the second housing, and in which the projecting portion is arranged such that the projecting portion is rotatably coupled to the notched portion, wherein a switch is provided inside the projecting portion and a sub-key capable of depressing the switch is provided to the projecting portion, and wherein the sub-key is provided on a surface of the projecting portion such that a depression direction of the sub-key coincides with a depression direction of the main key in the opened state and the sub-key does not protrude out from a plane defined by the second housing in the closed state.

Also, it may be preferable that a portion of the surface of the projecting portion around the sub-key is cut out.

Also, it may be preferable that a portion of the surface of the projecting portion, on which the sub-key is provided, is formed in a flat face, and the flat face is arranged substantially parallel to the second face.

Also, it is preferable that, in the projecting portion, corner portions between the flat face, on which the sub-key is provided, and a side face adjacent to the flat face is cut out, and a vertex face of the sub-key is formed in a curved face having a convex at a center thereof.

Also, it is preferable that an angle defined by the first face of the first housing and the second face of the second housing in the opened state is larger than 90 degree and smaller than 180 degree.

Furthermore, a width of the sub-key is wider than a width of a surface of the portion on which the sub-key is provided, within the surface of the projecting portion

Advantage of the Invention

According to the present invention, it is possible to provide the portable terminal device equipped with the novel key arrangement, capable of realizing sufficient degree of freedom of designs and also capable of securing the operability.

BRIEF DESCRIPTION OF THE DRAWINGS

FIG. 1 is an outer appearance perspective view showing a portable telephone according to an embodiment of the present invention in an opened state.

FIG. 10 is a diagram showing a structure for mounting the sub-key on the portable telephone of FIG. 1.

Figure 2A:
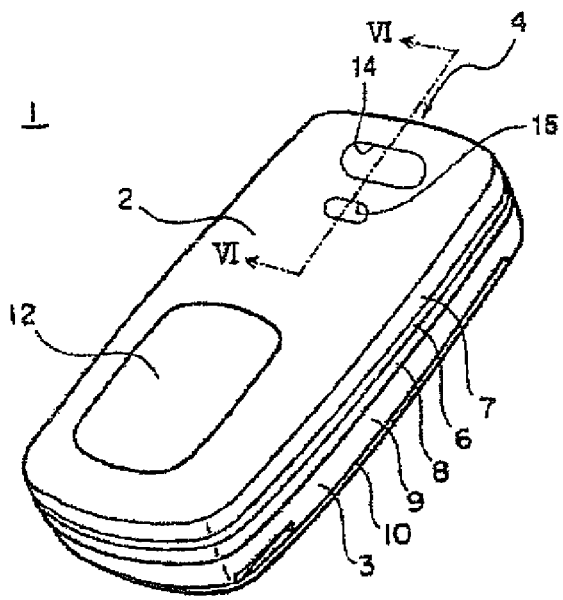
FIG. 2(a) is an outer appearance perspective view showing the portable telephone of FIG. 1 in a closed state.
Figure 2B:
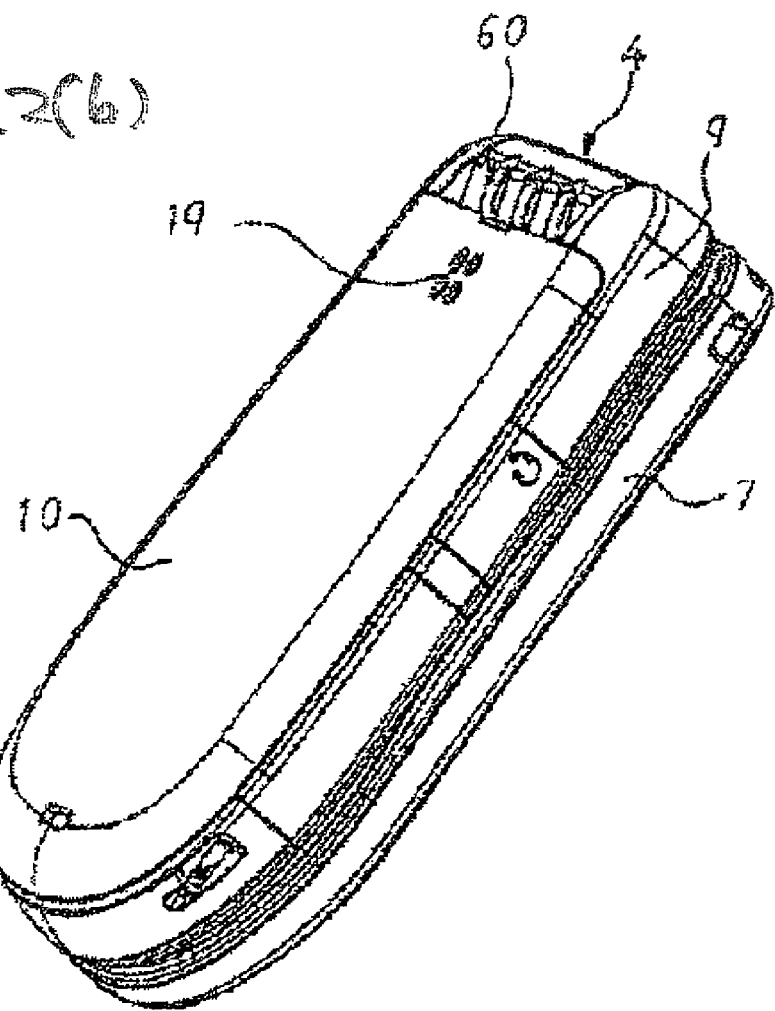
FIG. 2(b) is another outer appearance perspective view showing the portable telephone of FIG. 1 in the closed state.

DESCRIPTION OF REFERENCE NUMERALS AND SIGNS 1 portable telephone
2 first housing
3 second housing
4 coupling portion
17 main key portion
21 projecting portion
25 stepped portion
22 notched portion
27 recessed portion
33 camera module
41 holder
60 sub-key
61 concave portion
62 tactile switch

BEST MODE FOR CARRYING OUT THE INVENTION

Referring to FIG. 1 to FIG. 10, a description will be made on an embodiment of a configuration of a portable terminal device according to the present invention. FIG. 1, FIG. 2(a), and FIG. 2(b) are outer appearance perspective views showing a portable telephone 1 according to the embodiment of the present invention. The portable telephone 1 is configured as a so-called foldable portable telephone, FIG. 1 shows an opened state of the portable telephone 1, and FIG. 2(a) and FIG. 2(b) show a closed state thereof.

The portable telephone 1 includes a telephone receiving housing (first housing) 2 and a telephone transmitting housing (second housing) 3. An end portion of the telephone receiving housing 2 is coupled to an end portion of the telephone transmitting housing 3 by a coupling portion 4. And, the portable telephone 1 can be opened and closed as a portion of the portable telephone 1 on the side of the coupling portion 4 being a center of a swing operation. Each of the telephone receiving housing 2 and the telephone transmitting housing 3 is formed to have a shape of a substantially slim type rectangular parallelepiped. In the closed state, the telephone receiving housing 2 is overlapped with the telephone transmitting housing 3, so that contours thereof are substantially coincident with each other when the portable telephone 1 is viewed from one housing side to the other housing side.

The telephone housing 2 includes a front case 6 on the side of a face (namely, front face, first face "S1") which faces the telephone transmitting housing 3 in the closed state, and a rear case 7 on the side of a rear face thereof. The front case 6 and the rear case 7 are molded by, for example, resin. Sound output openings of a speaker 13 for telephone communication is opened in the front case 6 of the telephone receiving housing 2, whereas an opening window 14 for a camera module and a opening window 15 for a flash is opened in the rear case 7.

A main display portion (display user interface) 11 for displaying an image on the front face, and a sub-display portion 12 for displaying the image on the rear face is provided to the telephone receiving housing 2. The main display portion 11 and the sub-display portion 12 are configured by, for instance, liquid crystal displays. The main display portion 11 has an area which is made larger than, or equal to, for example, a half value of a front face area of the telephone receiving housing 2. A major portion of the front area of the telephone receiving housing 2 is covered by a protection cover 11a of the main display portion 11. The protection cover 11a is formed by, for example, an acrylic plate.

The telephone transmitting housing 3 includes a front case 8 on the side of a face (front face, namely, second face "S2") which faces the telephone receiving housing 2 in the closed state, a rear case 9 on the side of a rear face thereof, and a lid body 10 which is covered on the rear face of the rear case 9. The front case 8, the rear case 9, and the lid body 10 is molded by, for instance, resin. Sound collecting openings 18 of a microphone for a telephone communication are opened in the front case 8 of the telephone transmitting housing 3, whereas sound output openings 19 of a speaker for announcement are opened in the lid body 10. Although not shown in the drawings, a built-in type first antenna is arranged in an interior portion in the vicinity of the sound collecting openings 18 of the microphone for telephone communication, namely, on the side opposite to the coupling portion 4 within the telephone transmitting housing 3.

A main key portion (operation user interface) 17 for receiving operation by a user is provided on the telephone transmitting housing 3. Various sorts of buttons are arranged on the main key portion 17, and are exposed from the front case 8. These buttons include, for instance, numeric keys 17a, a cursor key 17b, function keys 17c, and the like. It should be understood that various sorts of buttons of the main key portion 17 are provided in a continuous (adjoining) manner, and thus, partitions (frames) which mutually partition these various sorts of buttons are not provided. In other words, one opening portion 8a is provided in a key arranging region of the front case 8 and the keys 17a to 17c are exposed from this opening portion 8a.

Figure 3:
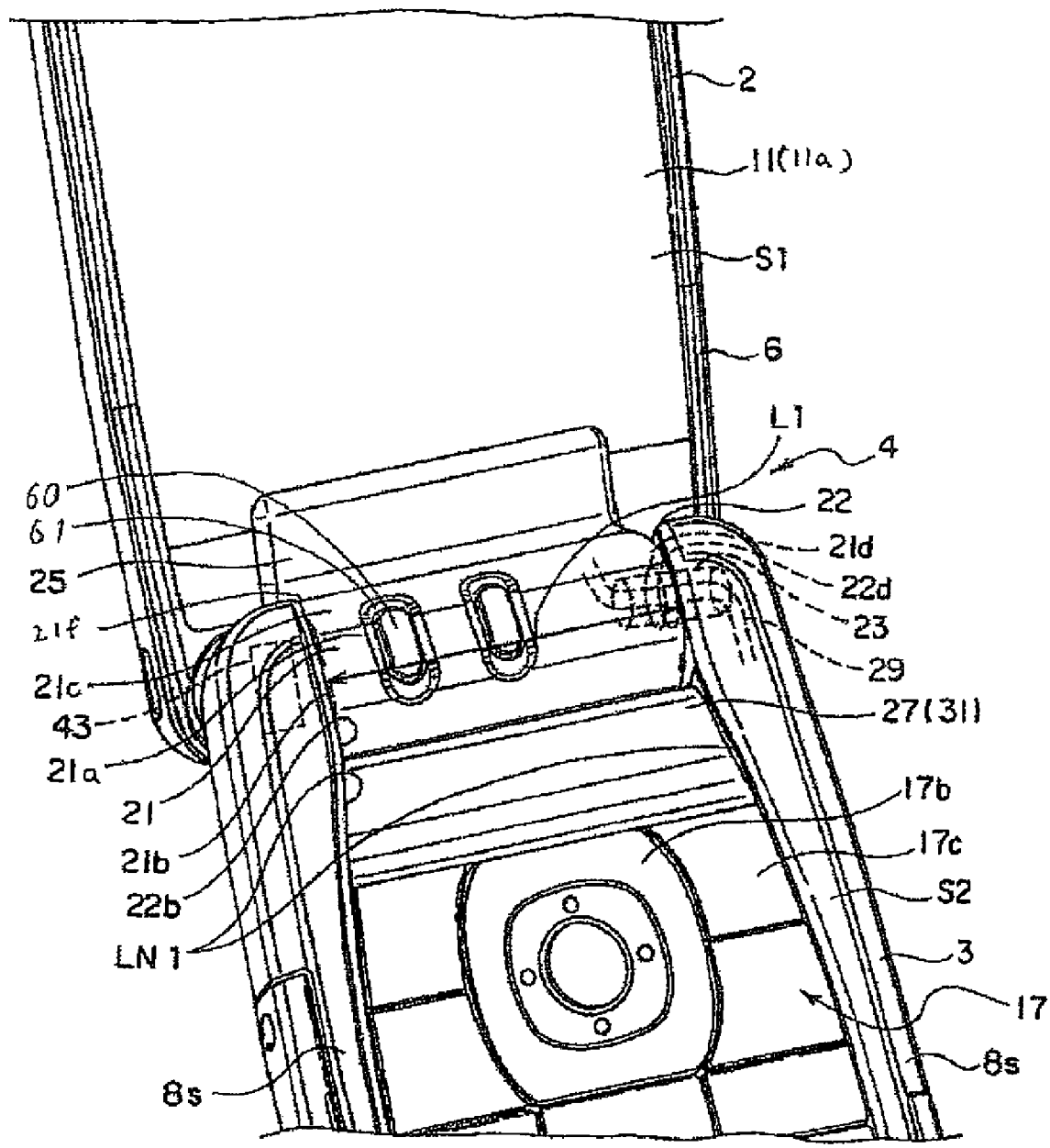
FIG. 3 is a perspective view showing an area near a coupling portion of the portable telephone of FIG. 1 in the opened state, as viewed from a front face side.
Figure 4:
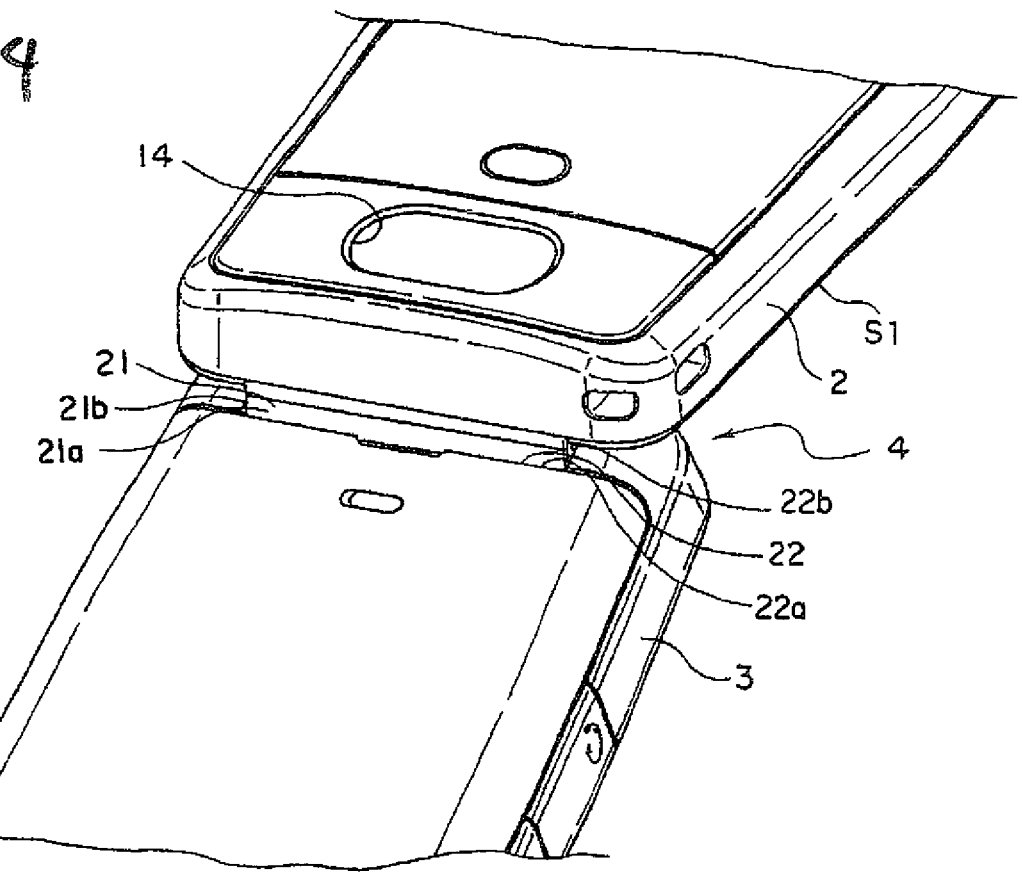
FIG. 4 is a perspective view showing an area near the coupling portion of the portable telephone of FIG. 1 in the opened state, as viewed from a rear face side.
Figure 5:
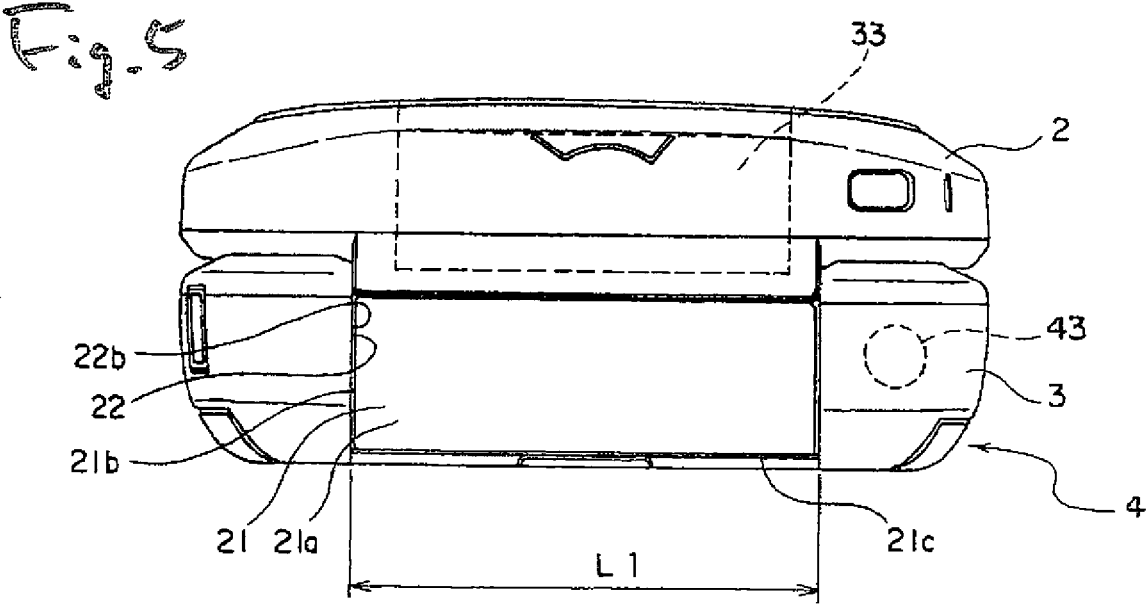
FIG. 5 is a perspective view showing an area near the coupling portion of the portable telephone of FIG. 1 in the closed state, as viewed from the coupling portion side.
Figure 6:
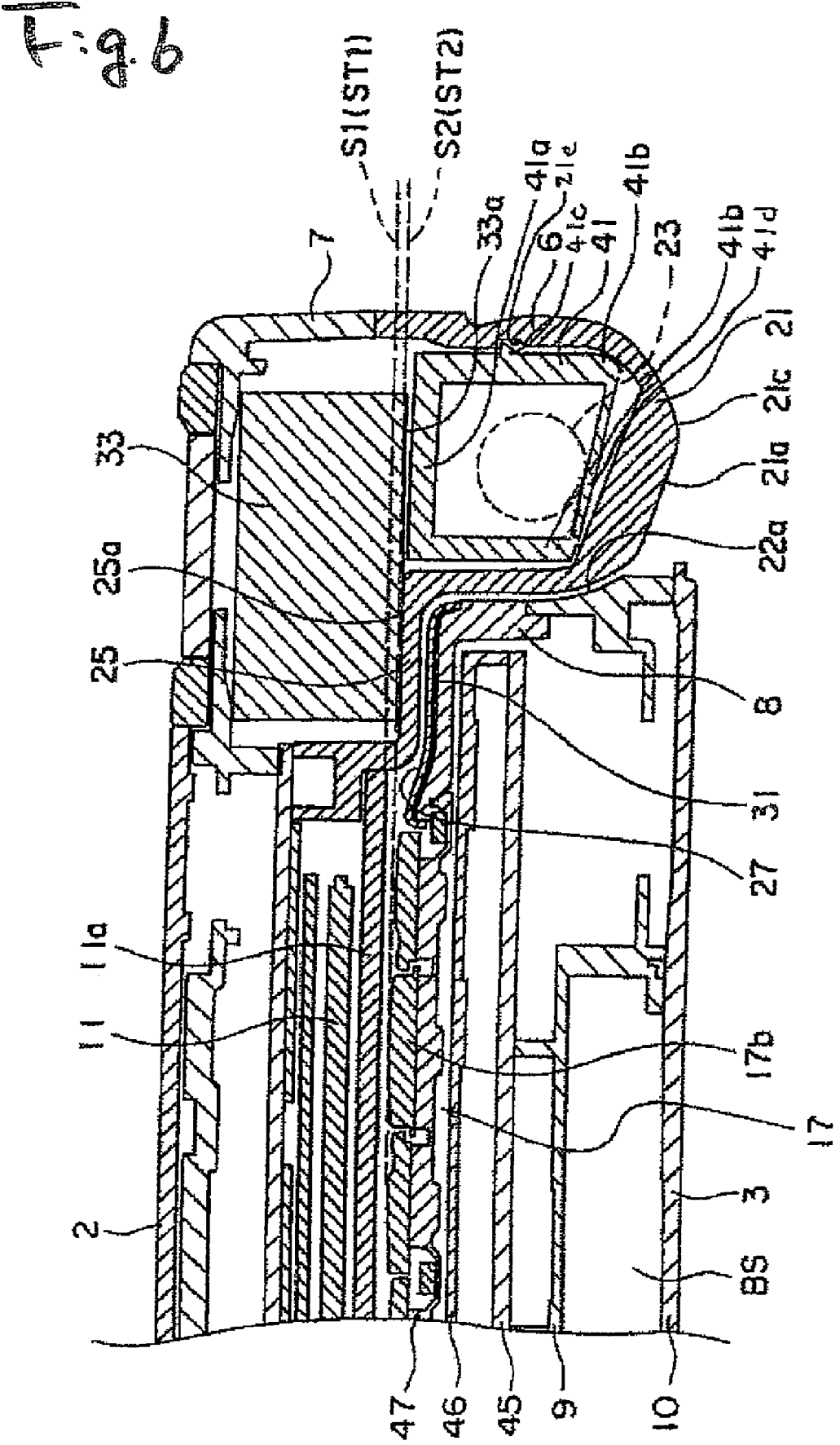
FIG. 6 is a sectional view of the portable telephone, taken along an arrow-viewing direction of VI-VI line shown in FIG. 2.

FIG. 3 is a diagram showing a portion of the portable telephone 1 in the opened state, in the vicinity of the coupling portion 4 thereof, as viewed from the front face side. FIG. 4 is a diagram showing a portion of the portable telephone 1 in the opened state, in the vicinity of the coupling portion 4 thereof as viewed from the rear face side. FIG. 5 is such a diagram that the portion near the coupling portion 4 of the portable telephone 1 in closed state is viewed parallel to a face opposite to the telephone receiving housing 2 and the telephone transmitting housing 3. FIG. 6 is a sectional view showing the portion near the coupling portion 4 of the portable telephone 1 in closed state (namely, sectional view, taken along arrow-pointed direction of line VI-VI of FIG. 2(a)).

As shown in FIG. 3 to FIG. 5, the coupling portion 4 is configured such that a projecting portion 21 which projects from one end of the telephone receiving housing 2 is fitted into a notched portion 22 which is provided in one end of the telephone transmitting housing 3, and also, a shaft member 23 is inserted into a wall portion of the notched portion 22 and into the projecting portion 21. Both the telephone receiving housing 2 and the telephone transmitting housing 3 are mutually rotatable with each other as the shaft member 23 being a rotation shaft. The projecting portion 21 projects from a stepped portion 25 and constitutes a portion of the stepped portion 25. As shown in FIG. 6, in the closed state, the stepped portion 25 is stored in a recessed portion 27 which continues to the notched portion 22, and the first face S1 faces the second face S2 with a smaller interval than a height of a base portion of the stepped portion 25 from the first face S1. It is noted that a clearance between the first face S1 and the second face S2 is maintained by, for instance, a protruding portion 11b provided on one of the first face S1 and the second face S2 abuts against the other face within the first face S1 and the second face S2. In this example, the protruding portion 11b is constituted by convex-shaped members made of rubber and provided on both sides of the sound output openings of the speaker 13 in FIG. 1.

As shown in FIG. 3 to FIG. 6, the projecting portion 21 is provided on the first face S1 of the telephone receiving housing 2. Both the projecting portion 21 and the stepped portion 25 are integrally formed with the front case 6 by, for example, resin and the like. One piece of the projecting portion 21 is provided on the end portion of the telephone receiving housing 2 at a center portion in a rotation shaft direction, and is formed in a substantially semicylindrical shape around the rotation shaft. A projected amount of the projecting portion 21 from the first face S1 is set to be, for example, equal to, or slightly smaller than a thickness of the telephone transmitting housing 3. As a result, it is possible to avoid that the projecting portion 21 is projected from the front face and the rear face of the telephone transmitting housing 3 in the opened state and in the closed state, which may deteriorate the designing characteristic thereof. A length "L1" of the projecting portion 21 in the rotation shaft direction is set to be relatively long. For example, this length "L1" is set to be equal to 50 to 70 percent of width of the telephone receiving housing 2 and the telephone transmitting housing 3.

The base portion of the stepped portion 25 is formed in, for example, a rectangular parallelepiped shape, and is formed at a slightly higher level than the first face S1. In the rotation shaft direction, a width of the base portion of the stepped portion 25 is set to be equal to the width of the projecting portion 21. It is noted that since the projecting portion 21 can be fitted into the notched portion 22 by being inserted thereinto, the width of the base portion of the stepped portion 25 is made narrower than the width of the notched portion 22. In a direction perpendicular to the rotation shaft direction, the width of the base portion of the stepped portion 25 is set to be wider than the width of the projecting portion 21, and the projecting portion 21 projects from a position of the stepped portion 25, which is near the housing end portion. It is noted that the protection cover 11a is notched on the side of the coupling portion 4, and the stepped portion 25 provided on the front case 6 is formed such that the stepped portion 25 projects from this notched portion. A height of the stepped portion 25 from the first face S1 is set to be longer than a distance between the first face S1 and the second face S2 in the closed state.

The notched portion 22 is formed in a substantially rectangular shape having a dimension nearly equal to the dimension of the projecting portion 21, as viewed from a direction perpendicular to the second face S2, and is positioned at a center of an end portion of the telephone transmitting housing 3. As shown in FIG. 6, a very small gap is formed between an outer circumferential face of the projecting portion 21 around the rotation shaft and a wall face 22a of the notched portion 22 around the rotation shaft, so that the rotation of the projecting portion 21 is allowed with respect to the notched portion 22.

Figure 9A:
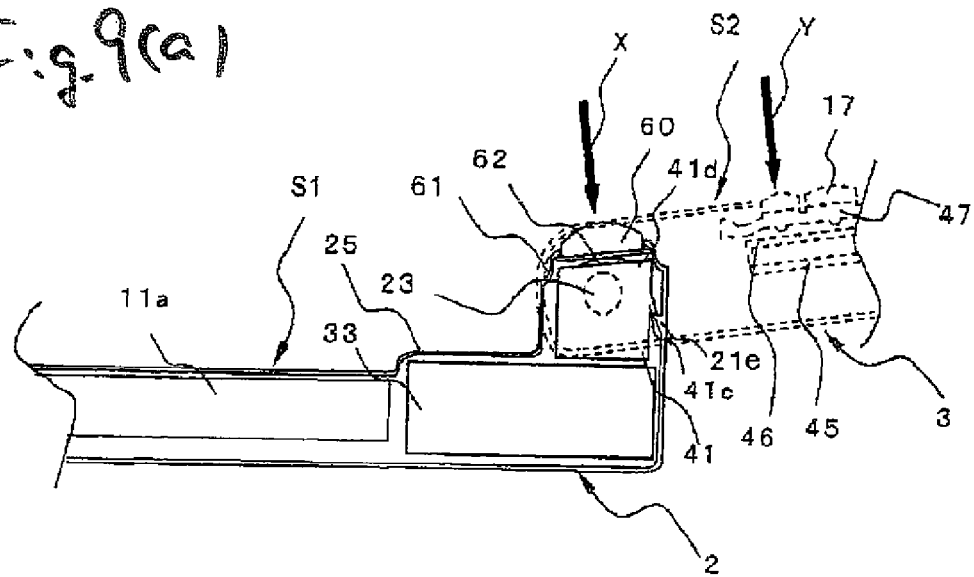
FIG. 9(a) is a sectional view showing a schematic structure of a sub-key.
Figure 9B:
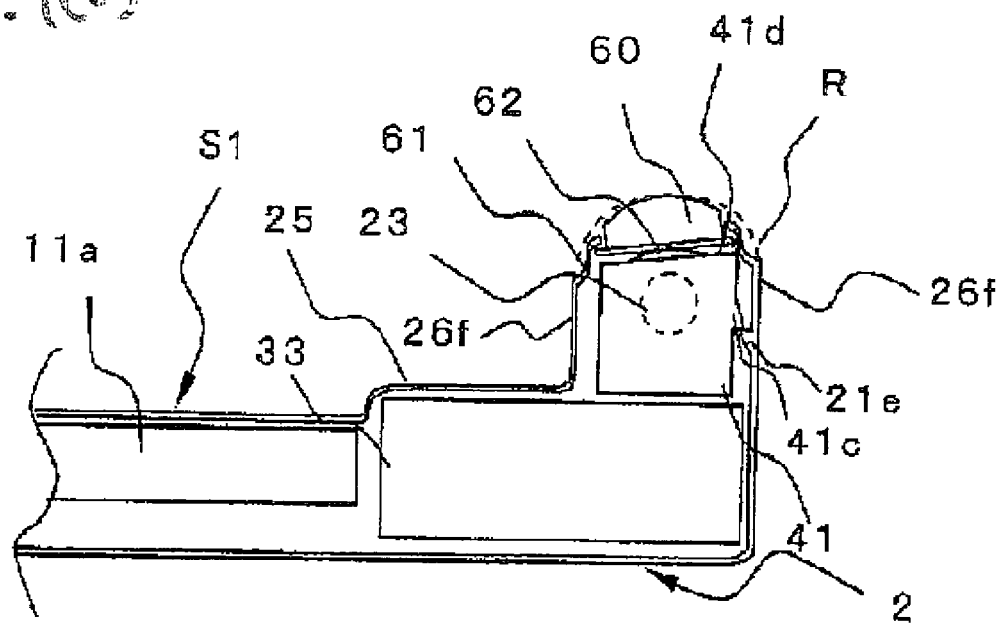
FIG. 9(b) is a sectional view showing another schematic structure of the sub-key.

As will be discussed later, a flat face 21a is formed on a surface of a tip portion of the projecting portion 21, and the flat face 21a becomes substantially parallel to the second face S2 in opened state. On this flat face 21a, a sub-key 60 is provided (note that if FIG. 6 is a sectional view for showing a portion where sub-key 60 is described, then flat face 21a cannot be indicated. Accordingly, sub-key 60 is not illustrated in FIG. 6). As shown in FIG. 9 (will be discussed later), although a center of a face of this sub-key 60 is made in a convex shape, which is depressed by a finger of a user, a distance of a vertex portion of this convex shape from the rotation shaft is set to be equal to, or shorter than a distance from other surface portion in the projecting portion 21 in order that this vertex portion is not contacted with the wall face 22a when the projecting portion 21 is rotated within the notched portion 22. In other words, a portion of the sub-key 60 is configured such that the rotation radiuses become equal to each other.

Also, as shown in FIG. 3, a width of the sub-key 60 along a longitudinal direction of the portable telephone 1 is made wider than a width of the flat face 21a in the longitudinal direction of the portable telephone 1. As a result, for example, in such a case that the user depresses the sub-key 60 by using the finger cushion, since the depressing operation by the finger cushion is not stopped by the flat face 21a in the longitudinal direction of the portable telephone 1, the sub-key 60 can be readily depressed.

On the other hand, as shown in FIG. 3 to FIG. 5, an end face 21b of the projecting portion 21, which perpendicularly intersects with the rotation axis, abuts against a wall portion 22b of the notched portion 22 which sandwiches the projecting portion 21. When the portable telephone 1 is opened and closed, these faces are slidable.

A recessed portion 27 is formed to have a concave with respect to the second face S2 in a region between the notched portion 22 and the main key portion 17. For example, as shown in FIG. 6, the recessed portion 27 is configured such that an end portion of this recessed portion 27 is formed in a concave shape, which is located on the side of the coupling portion 4 of the front case 8 of the telephone transmitting housing 3, and this concaved portion is covered with an electric conducting plate 31 made of aluminum and the like. Since the electric conducting plate 31 is provided, noise generated from a camera module 33 (will be discussed later), and noise propagated into the camera module 33 are shielded. It is noted that an electric conducting paint may be painted instead of the electric conducting plate 31. Alternatively, if these electric conducting portions are electrically conducted to a reference potential line, even when electrically charged fingers are put on the main key portion 17, electrostatic energy may be earthed to the reference potential line. Alternatively, only the front case 8 may be formed in the concave shape, and the electric conducting plate and the like for the shielding may be not provided.

As shown in FIG. 6, the recessed portion 27 is formed such that the recess gradually becomes deep from the side of the main key portion 17 to the side of the notched portion 22, that is, the recessed portion 27 is formed such that a natural slope is formed from the key surface of the cursor key 17b and the key surface of the function key 17c which are located adjacent to the recessed portion 27. In other words, a recessed amount on the side of the main key portion 17 with respect to the second face S2 is made smaller than a recessed amount on the side of the notched portion 22 with respect to the second face S2.

As shown in FIG. 3, as viewed along the direction perpendicular to the second face S2, the received portion 27 is formed in a substantially trapezoidal shape which has widened width from the side of the notched portion 22 to the side of the main key portion 17. A width of the recessed portion 27 on the side of the notched portion 22 is equal to that of the notched portion 22, and a width of the recessed portion 27 on the side of the main key portion 17 is equal to a width of the main key portion 17 on the side of the recessed portion 27. As a consequence, in the rotation shaft direction, both edges of the notched portion 22, both edges of the recessed portion 27, and both edges of the main key portion 17 (opening portion of telephone transmitting housing 3 for exposing numeric keys 17a etc.) constitute a continuous line "LN1". In other words, no stepped portion exists among these both edges. For example, these edge portions extend in a smoothly curved line shape such that the edge portions extend parallel to each other in the notched portion 22, and intervals among these edge portions are gradually widened from a portion near a boundary between the notched portion 22 and the recessed portion 27 to the main key portion 17.

It is noted that both a reference as to the projected amounts of the projecting portion 21 and the stepped portion 25, and a reference as to the recessed amount of the recessed portion 27 may be specified by, for example, defining a joined faces which can be externally viewed as the reference when the telephone receiving housing 2 and the telephone transmitting housing 3 are closed. For example, a reference "ST1" for the projected amounts of the projecting portion 21 and the stepped portion 25 may be defined based on the protection cover 11a of the main display portion 11. Also, a reference "ST2" for the recessed amount of the recessed portion 27 may be defined based on, for instance, a surrounding portion 8s (refer to FIG. 3) of the main key portion 17.

As shown in FIG. 3 and FIG. 6, the shaft member 23 includes, for example, a cylindrical-shaped portion, and this shaft member 23 is inserted into a hole portion 21d which is opened in the end face 21b of the projecting portion 21, and another hole portion 22d which is opened in the wall portion 22b of the notched portion 22. The shaft member 23 is axially supported with respect to at least one of the notch portion 22 and the projecting portion 21. It is noted that although two pieces of the shaft members 23 are provided in correspondence with both end faces 21b of the projecting portion 21, only one piece of the shaft member 23 is shown in FIG. 3. A signal line 29 which electrically connects the telephone receiving housing 2 with the telephone transmitting housing 3 is inserted into one piece of the two shaft members 23. It is noted that a click mechanism capable of producing a clicking feeling when the portable telephone 1 is opened and closed is provided on the other shaft member of the two shaft members 23.

As shown in FIG. 6, the camera module 33 is provided on the end portion of the telephone receiving housing 2 on the side of the coupling portion 4. The camera module 33 takes photographs by receiving light from the opening window 14 of the telephone receiving housing 2. As viewed from the direction perpendicular to the first face S1, the size of the camera module 33 is slightly smaller than the size of the stepped portion 25. Since a rear face 33a of the camera module 33 is stored in the stepped portion 25, the camera module 33 is arranged at such a position which is projected to the side of the telephone transmitting housing 3 rather than the first face S1 (refer also to FIG. 5). It is noted that since the camera module 33 projects from the first face S1 to the side of the telephone transmitting housing 3 on the root side of the projecting portion 21, it is also possible to grasp that a portion of the camera module 33 is stored in the projecting portion 21.

Figure 7:
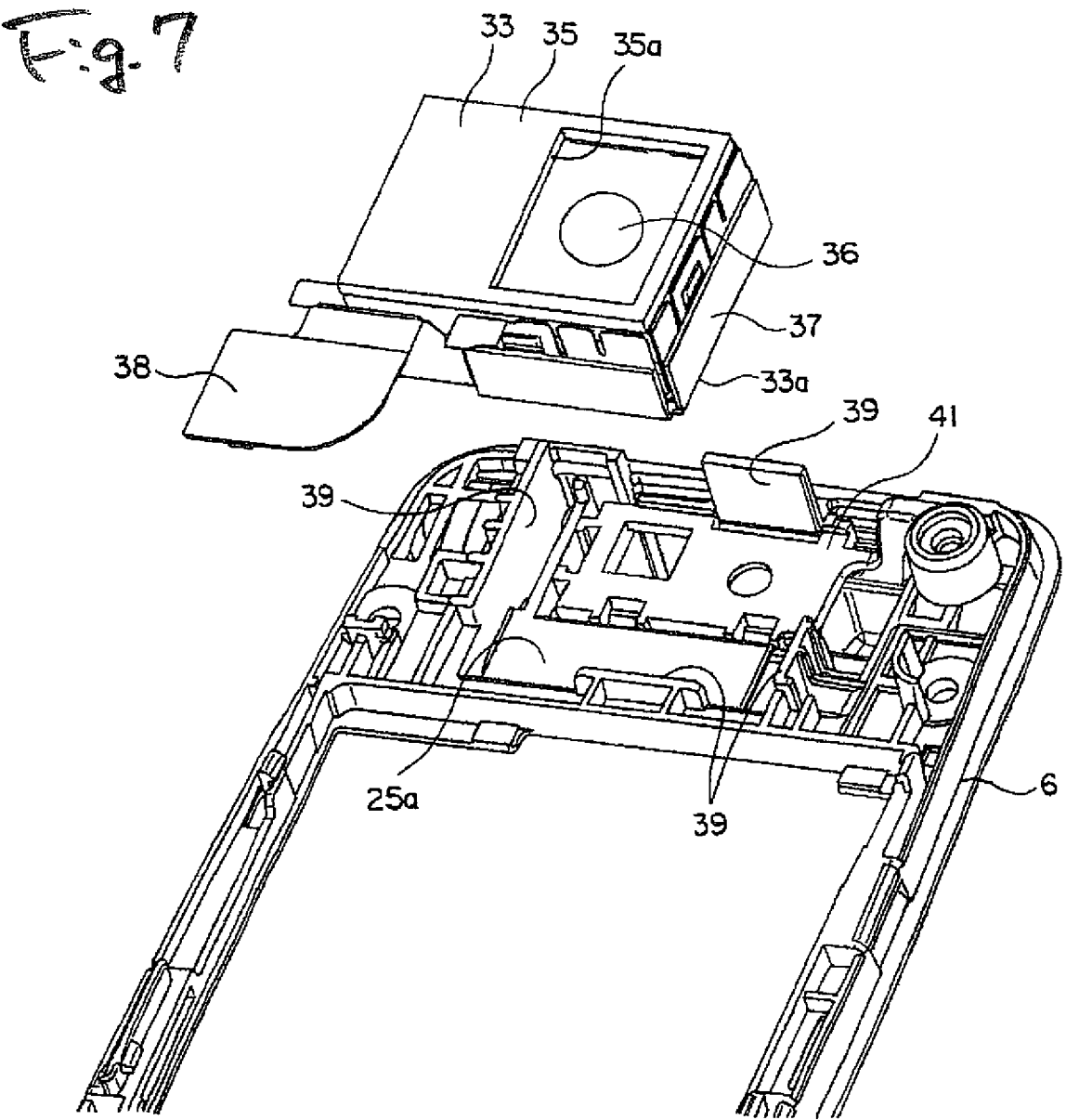
FIG. 7 is an exploded perspective view showing a state in which a camera module is dismounted.

FIG. 7 is an exploded perspective view showing that the camera module 33 is dismounted from the front case 6 of the telephone receiving housing 2. It is noted that a rear direction of FIG. 7 as viewed on a sheet surface corresponds to a forward direction of FIG. 1 as viewed on a sheet surface.

The camera module 33 includes a housing 35 having a substantially rectangular parallelepiped shape. An opening window 35a having a size nearly equal to a half size of the housing 35 is opened in the housing 35, and an optical module is stored in an approximately half area of the housing 35 on the side of the opening window 35a. The optical module includes optical lenses containing a lens 36 which is exposed from the opening window 35a; a mechanical shutter (not shown) which opens and closes an optical path of the optical lenses; and an imaging element (not shown) such as a CCD, or a CMOS, on which light propagated from the optical lens 36 is focused. Also, an actuator (not shown) for driving the mechanical shutter of the optical module is stored in an approximately half area of the housing 35, which is opposite to the opening window 35a.

The camera module 33 is stored in a box-shaped shield case 37, and is connected to a flexible printed circuit (FPC) 38 for electrically connecting the camera module 33 to a board and the like which is provided in the telephone transmitting housing 3. It is noted that since the shield case 37 is to be mounted to the camera module 33 in order to avoid that noise is mixed into the imaging element of the camera module 33, this shield case 37 may be recognized as a portion of the camera module 33.

A plurality of plate-shaped ribs 39 for fixing the camera module 33 projects from the front face side to the rear face side (namely, inner side of housing) on the front case 6. The camera module 33 is engaged and inserted among the ribs 39 so as to be fixed with respect to the front case 6.

Also, the camera module 33 are arranged by facing the rear face thereof with respect to an inner side face 25a of the stepped portion 25 and a holder 41 provided in the projecting portion 21 (refer also to FIG. 6), and is fixed with respect to both the front case 6 and the rear case 7 by that the rear case 7 covers the camera module 33 from the side of the opening window 35a.

The holder 41 includes an abutting portion 41a against which the rear face of the camera module 33 abuts; a supporting portion 41b for supporting the abutting portion 41a; and a switch mounting portion 41d (will be explained later) which is located at a tip portion of the supporting portion 41b and on the opposite side of the abutting portion 41a. The abutting portion 41a includes, for example, a plate-shaped member which is continued substantially parallel to the inner side face 25a of the stepped portion 25. The supporting portion 41b includes, for example, two pieces of plate-shaped portions which perpendicularly intersects with the abutting portion 41a and are parallel to the rotation shaft. The supporting portion 41b abuts against the inner side face of the projecting portion 21 so as to support the abutting portion 41a. Furthermore, an anchor portion 41c is formed on the supporting portion 41b, when the holder 41 is inserted into the projecting portion 21, this holder 41 is fitted into an anchoring concave portion 21e of the inner side face thereof so as to be anchored. As a result, it is possible to avoid that the holder 41 is extracted in the assembling step. It is noted that both the shaft member 23 and another shaft member provided on the not-illustrated side is inserted into gaps formed by the abutting portion 41a, two pieces of the supporting portions 41b, and further, the switch mounting portion 41d. In addition, an electronic component such as a motor for vibrator is fixed between the two shaft members by the holder 41. Since the motor for vibrator is fixed on the above-described inner side face of the holder 41, vibrations of this vibrator can be propagated to the entire portable telephone 1.

As shown in FIG. 6, the rear case 9 of the telephone transmitting housing 3 is formed to have a plurality of ribs 39 on the housing inner-sided face and the housing outer-sided face in order to form the storage spaces for storing various sorts of electronic components such as a battery storage space BS and the like. The lid body 10 is covered on the rear case 9 such that this lid body 10 covers a storage space formed on the housing outer side, which contains the battery storage space BS.

A main board 45 on which a high frequency circuit (not shown) and the like are provided is mounted on the housing inner side of the rear case 9. A shield case (not shown) for shielding the high frequency circuit and the like covers the main board 45, and a key FPC 46, on which a plurality of depression switches (not shown) are provided, is provided on this shield case. A key seat 47 is arranged so as to depress the depression switches on the key FPC 46. While the front case 8 is covered on the key seat 47, the key seat 47 is sandwiched between the key FPC 46 and the front case 8 so as to be fixed. The key seat 47 is made of, for example, silicone.

The keys 17*a* to 17*c* are fixed with respect to the key seat 47. Since the user depresses the keys 17*a* to 17*c*, the user can depress the depression switches of the key FPC 46 via the key seat 47. It is noted that the main key portion 17 includes the keys 17*a* to 17*c*, the key seat 47, and the key FPC 46.

One end of the signal line 29 at the side of the telephone receiving housing 2 and shown in FIG. 3 is connected to the FPC 38 of the camera module 33 via, for example, a board and the like which are employed so as to control the main display unit 11. Also, the other end of the signal line 29 at the side of the telephone transmitting housing 3 is connected to, for example, the main board 45 (refer to FIG. 6). On the main board 45, a CPU (not shown) is provided, while the CPU outputs various sorts of control signals in response to signals supplied form the main key portion 17. As a consequence, the signal line 29 transmits, for example, a signal supplied from the main key portion 17 via the CPU of the main board 45 to the camera module 33.

As shown in FIG. 3 and FIG. 5, a second antenna 43 is built in the telephone transmitting housing 3 in order to transmit and receive electromagnetic waves. The second antenna is arranged at the end portion of the telephone transmitting housing 3 on the side of the coupling portion 4 and in such a portion which sandwiches the projecting portion 21. As a consequence, the second antenna 43 is not overlapped with at least the stepped portion 25 in the rotation shaft direction of the coupling portion 4 in the closed state. It is noted that since the first antenna is positioned at a place separated from the coupling portion 4, this first antenna is, apparently, not overlapped with the coupling portion 4 in the closed state. Both the first antenna and the second antenna 43 are employed in order to perform a telephone communication, and also to transmit and receive mails, and any one of these first and second antennas may serve as a main antenna which is continuously utilized, or may serve as a sub-antenna.

Figure 8:
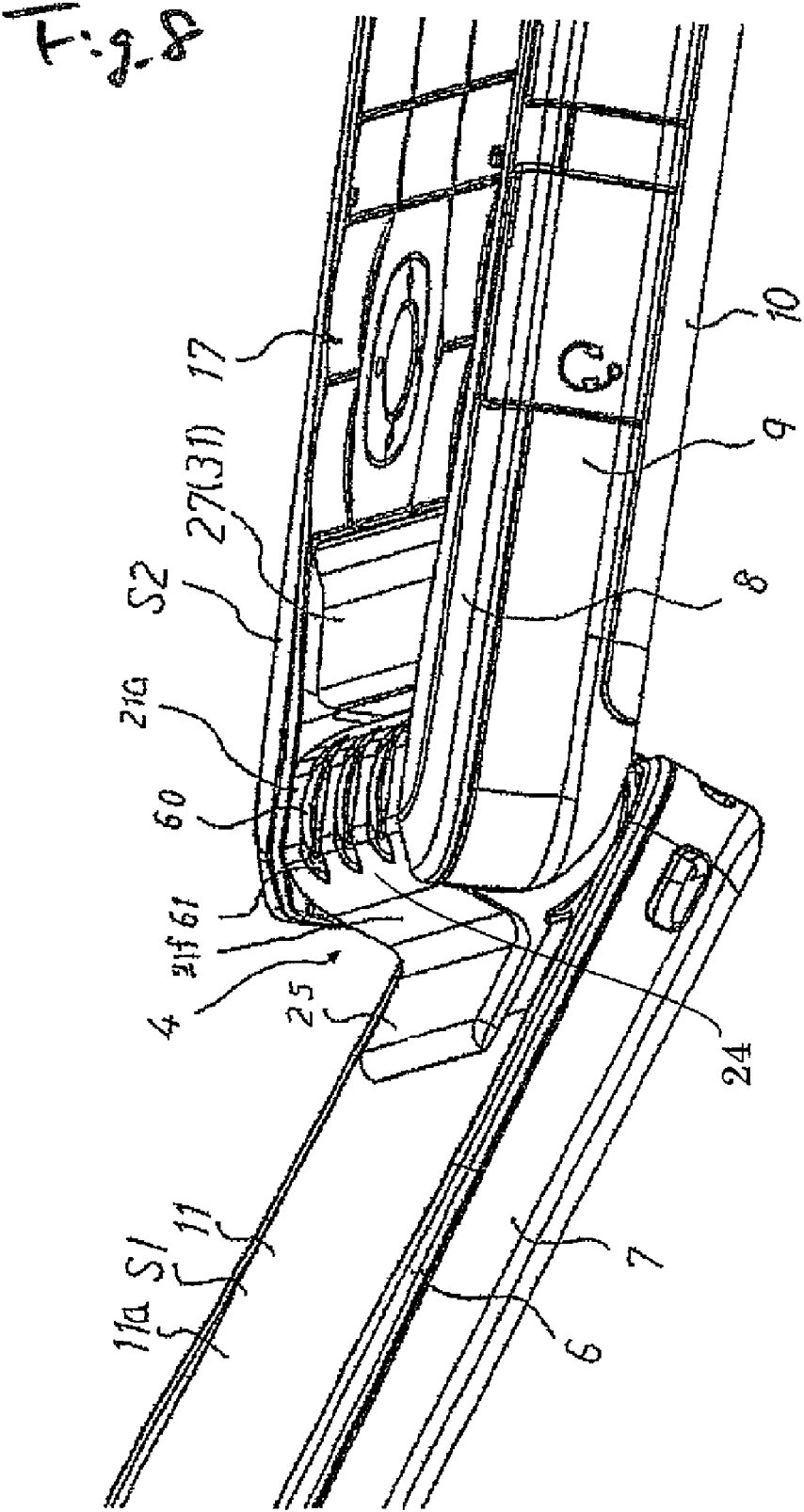
FIG. 8 is a perspective view showing an area near the coupling portion of the portable telephone of FIG. 1 in the opened state.

Next, a description will be made on a configuration of the sub-key 60 with reference to FIG. 8 and FIG. 9. FIG. 8 and FIG. 9 show the opened state in which the first housing 2 is anchored with the second housing 3 such that an angle defined by the first face S1 and the second face S2 may be larger than 90 degree and smaller than 180 degree with the shaft member on the side having the click mechanism in order that the first face S1 and the second face S2 may be fitted to an ear and a mouth of a user when the user performs a telephone communication. Preferably, the angle defined by the first face S1 and the second face S2 may be selected from approximately 160 degree to approximately 170 degree.

As previously explained, the flat face 21*a* which becomes substantially parallel to the second face S2 is formed at the tip surface 21*c* of the projecting portion 21. This flat face 21*a* is slightly (approximately 10 to 20 degree) inclined with respect to the first face S1, and three pieces of the sub-keys 60 are provided on this flat face 21*a* (in FIG. 3, only two pieces of sub-keys 60 are illustrated in order to show peripheral structure of shaft member 23). Also, a corner portion 24 between the flat face 21*a* and a side face 21*f*, which is sandwiched by the end faces 21*b* and adjacent to the flat face 21*a*, is cut out so as to have either a multi-face or a curved face. Furthermore, three pieces of substantially elliptical-shaped concave portions 61 are formed on the projecting portion surface 21*c* containing this flat face 21*a* by cutting out the surface. Then, the sub-keys 60 similarly having elliptical shapes are arranged at the center of this concave portions 61, respectively.

FIG. 9(*a*) and FIG. 9(*b*) are sectional views schematically showing a sub-key 60. In addition, FIG. 10 is a structural diagram when the sub-key 60 and the holder 41 are assembled in the front case 6 of the telephone receiving housing 2 in such a state that the protection cover 11*a* is mounted. A description will be made on a peripheral configuration as to the sub-key 60 with reference to these drawings.

A tactile switch 62 is fixed at a place corresponding to the lower portion of the sub-key 60 within the projecting portion 21 such that the tactile switch 41 is mounted on a switch mounting portion 41*d*. A depressing piece (not shown) for depressing the tactile switch 62 is provided on a face of the a sub-key 60, which is opposite to a depression face (face depressed by user) exposed at the surface of the sub-key 60. And, the tactile switch 62 is depressed in depression state of the sub-key 60 so as to energize the switch. Also, as previously described, the sub-key 60 is configured such that a center of the depression face has a curved face 64 which constitutes the convex shape. The distance of the vertex portion 65 from the rotation shaft center is set to be equal to, or lower than another surface portion in the projecting portion 21. The corner portion of the tip surface of the projecting portion 21 is cut out in order that the tip surface does not interfere with the notched portion 22 when the tip surface is pivotally moved, and the cross section thereof is formed in a substantially arc shape as the shaft member 23 being a rotation shaft, and further, the flat face 21*a* is formed on a portion thereof (refer to FIG. 6). In other words, in such a manner that this flat face 21*a* is formed, as indicated by a broken line "R" in FIG. 9(*b*), the projected amount of the sub-key 60 is adjusted within such a range that the sub-key 60 is not projected from the above-described substantially arc shape in non-depression state. As a result, the vertex portion having the convex shape is not also contacted with the wall face 22*a* when the portable telephone 1 is pivotally moved between the opened state and the closed state. Also, since the concave portion 61 has the substantially elliptical shape, when the concave portion 61 is depressed, the finger cushion of the user is entered into the concave portion 61, so that the key stroke can be secured even in a small projected amount. An assembling sequence is given as follows. That is, as shown in FIG. 10, first of all, the switch 62 is mounted on the switch mounting unit 41*d* of the holder 41 into which the electronic component such as the vibrator is assembled. Next, the sub-key 60 (three pieces of sub-keys are integrally combined with each other so as to constitute sub-key 60 in this example) is inserted from the inner side of the projecting portion 21 such that the depression face is exposed from the opening formed at the center of the concave portion 61 having the elliptical shape, and thereafter, the holder 41 is fitted, on which the switch 62 is mounted.

Also, the holder 41 is configured so that the switch mounting portion 41*d* is inclined with respect to the abutting portion 41*a* such that the switch mounting portion 41*d* becomes parallel to the flat face 21*a*. The tactile switch 62 is arranged in this holder 41 and the sub-key 60 is provided at such a position where this tact key 62 can be depressed just under the sub-key 60. Also, the sub-key 60 is provided parallel to the tactile switch 62, namely, is inclined by 10 to 20 degree with respect to the first face S1. Since the tactile switch 62 is such a switch which may be energized by being depressed along the just under direction, the stroke of the sub-key 60 becomes such a direction "X" corresponding to a direction which perpendicularly intersects with the plane parallel to the tactile switch 62. On the side of the telephone transmitting housing 3, the following fact is known. That is, the second face S2, the main board 45, the depression switch and key seat 47, and the main key portion 17 is provided parallel to each other; and a direction "Y" along which the key is stroked is given to such a direction perpendicular to this parallel plane. In other words, when the portable telephone 1 is brought into the opened state, the flat face 21*a* becomes parallel to the second face S2, so that the direction "X" corresponding to the depression direction (stroke direction) of the main key portion 17 and the sub-key 60 becomes parallel to the direction "Y." According to this configuration, as to the depression stroke, the operation feelings of the main key 17 and the sub-key 60 can be made equal to each other, so that more natural operations can be given to the user. Further, since the flat face 21*a* is substantially parallel to the second face S2, if the user manipulates the main key 17 and the sub-key 60 by using the same finger, a moved amount of the sub-key 60 from such a plane that the second face S2 is defined as a reference when the user manipulates the sub-key 60 can be made small. Accordingly, this small moved amount may provide the user with the natural operation feelings.

In addition, the vertex of the convex portion of the sub-key 60 is configured such that, as shown in FIG. 2(*b*), when the portable telephone 1 is brought into the closed state, this vertex does not protrude out from the plane defined by the lid body 10. As a result, it is possible to configure that the sub-key 60 may be exposed, and does not protrude out from the plane. Accordingly, there is no possibility that when the portable telephone 1 is mounted on a desk, the sub-key 60 is depressed by the own weight unless the user depresses the sub-key 60 by the user's intention.

Also, as described above, the telephone transmitting housing 3 contains the second antenna 43 for performing the communication at such a position that the second antenna 43 is not overlapped with the coupling portion 4 along the rotation shaft direction of the coupling portion 4 when the portable telephone 1 is in closed state, so that there is no electromagnetic interference caused by metal components involving the tactile switch 62.

Also, the numeric keys 17*a* and the function key 17*c* are arranged along the line "LN1" on the second face S2, and furthermore, the sub-key 60 is arranged on the face which is substantially parallel to the face, so that the key positions can be easily sensed by the fingers, and thus, the key manipulation can be ready carried out. For instance, the finger is slipped along the line LN1, so that the finger can abut against the keys arranged along the line "LN1." Moreover, since the recess of the recessed portion 27 is sensed by the finger at this time, the boundary line of the main key portion 17 on the side of the coupling portion 4 can be recognized. As a result, touch typing can also be easily realized, and furthermore, the boundary line between the sub-key 60 provided on the coupling portion 4 and the main key portion 17 can also be sensed by the finger cushion by this recessed portion 27.

The present invention is not limited to the above-described embodiment, but may be embodied in various modes.

A portable terminal device of the present invention may be any device in which a first housing is coupled to the telephone transmitting housing 3 by a projecting portion of the first housing and a notched portion of the telephone transmitting housing 3 such that they can be opened and closed, and a camera module is provided in the first housing. That is, the application of the present invention is not limited to the portable telephones, but also to, for instance, a personal computer, and a PDA (Personal Digital Assistance).

Also, although the opened state is exemplified as 160 to 170 degree, the present invention is not limited thereto. If a continuous feeling of operability with the main key portion 17 may be obtained, then an open degree (namely, angle defined by the first face S1 and second face S2) between the telephone receiving housing 2 and the telephone transmitting housing 3 may be alternatively selected to be such a state that this open degree larger than 90 degree and is smaller than 180 degree.

Both the stepped portion 25 and the recessed portion 27 may be not always required. For example, in such a case that a camera module is smaller than a notched portion which constitutes a coupling portion, the entire camera module may be stored by a stepped portion, and further, the entire stepped portion is inserted into the notched portion so as to constitute a coupling portion. As a result, the recessed portion may be alternatively omitted.

The main key portion 17 is not limited to such a key portion that a plurality of keys is continuously arranged (no partition is provided between keys). That is, the respective keys may be individually partitioned, or the respective keys may be alternatively partitioned in predetermined key groups. It is noted that when the partitions between the keys are eliminated, a main key portion may be reduced by such a space equal to the partition-eliminated area or keys may be increased by such a space equal to the partition-eliminated area.

When the partitions among the keys are eliminated, there are some possibilities that a position of a key can be hardly sensed by a finger tip. However, this problem may be solved by providing a recessed portion and a continued line (LN1) so that a boundary of key arranging areas may be sensed by the finger tip. For example, in such a case that at least two pieces of keys are arranged in a direction along which these keys are separated from the recessed portion, since the recessed portion may be sensed by the finger tip, the boundary between the keys on the side of the recessed portion may be recognized. As a consequence, positions of keys which are continued to the relevant key may also grasped.

The present patent application was filed based on Japanese Patent Application No. 2005-307594 filed on Oct. 21, 2005, the contents of which are incorporated hereinto as references.

The invention claimed is:

1. A portable terminal device in which a first housing is coupled to a second housing such that the first housing and the second housing can be opened and closed to be an opened state and a closed state, wherein the first housing comprises:
a display portion provided on a first face facing the second housing in the closed state; and
a projecting portion at an end portion of the first face, wherein the second housing comprises:
a main key provided on a second face facing the first housing in the closed state; and
a notched portion which is provided on an end portion of the second housing, and in which the projecting portion is arranged such that the projecting portion is rotatably coupled to inside of the notched portion, wherein a switch is provided inside the projecting portion and a sub-key capable of depressing the switch is provided to the projecting portion, wherein the sub-key is provided on a surface of the projecting portion such that a depression direction of the sub-key coincides with a depression direction of the main key in the opened state and the sub-key does not protrude out from a plane defined by the second housing in the closed state, wherein a positional relationship between the projecting portion and the first face is constant between the opened state and the closed state, wherein the projecting portion projects in a direction intersecting, the first face of the first housing at an inside part of the first housing in a width direction of the first housing, wherein a portion of the surface of the projecting portion, on which the sub-key is provided, is formed in a flat face, and wherein when in the open state the flat face is arranged substantially parallel to the second face and arranged on a substantially same surface as the second face.

2. The portable terminal device as claimed in claim 1, wherein the portion of the surface of the projecting portion around the sub-key is cut out.

3. The portable terminal device as claimed in claim 1, wherein, in the projecting portion, corner portions between the flat face, on which the sub-key is provided, and a side face adjacent to the flat face is cut out, and a vertex portion of the sub-key is formed in a curved face having a convex at a center thereof.

4. The portable terminal device as claimed in claim 1, wherein an angle defined by the first face of the first housing and the second face of the second housing in the opened state is larger than 90 degree and smaller than 180 degree.

5. The portable terminal device as claimed in claim 1, wherein a width of the sub-key is wider than a width of a surface of a portion on which the sub-key is provided, within the surface of the projecting portion.

6. The portable terminal device according to claim 1, wherein in the closed state, the flat face is provided at a substantially same position as the second face in a thickness direction of the second housing.

7. The portable terminal device according to claim 1, wherein the sub-key is exposed in the closed state.

8. The portable terminal device according to claim 1, wherein the plane defined by the second housing in the closed state is in a face of the second housing opposite to the second face.

* * * * *